United States Patent
Williams et al.

(10) Patent No.: US 7,830,133 B2
(45) Date of Patent: Nov. 9, 2010

(54) DUAL CIRCUIT WALL SWITCH OCCUPANCY SENSOR AND METHOD OF OPERATING SAME

(75) Inventors: Jonathan D. Williams, Austin, TX (US); Todd J. Blackman, Austin, TX (US); Thomas J. Hartnagel, Taylor, TX (US); Vadim Konradi, Austin, TX (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 12/232,319

(22) Filed: Sep. 15, 2008

(65) Prior Publication Data

US 2009/0115385 A1 May 7, 2009

Related U.S. Application Data

(63) Continuation of application No. 11/138,084, filed on May 27, 2005, now Pat. No. 7,432,690.

(51) Int. Cl.
*H02M 3/156* (2006.01)
*G08B 21/22* (2006.01)

(52) U.S. Cl. .................. 323/351; 323/288; 307/116; 340/565

(58) Field of Classification Search .............. 323/222, 323/223, 225, 266, 282, 284, 285, 288, 908, 323/351; 363/49, 80, 84, 89; 340/545.3, 340/554, 555, 565, 541; 307/116, 117
See application file for complete search history.

(56) References Cited

U.S. PATENT DOCUMENTS

| 4,607,210 A | 8/1986 | Ohms et al. |
| 4,669,036 A | 5/1987 | Cowett |
| 4,874,962 A * | 10/1989 | Hermans ............... 307/116 |
| 5,189,393 A | 2/1993 | Hu |
| 5,459,652 A | 10/1995 | Faulk |
| 5,640,143 A | 6/1997 | Myron et al. |
| 5,774,322 A | 6/1998 | Walter et al. |
| 5,777,837 A | 7/1998 | Eckel et al. |
| 5,812,383 A | 9/1998 | Majid et al. |
| 5,821,642 A | 10/1998 | Nishhira et al. |

(Continued)

FOREIGN PATENT DOCUMENTS

DE    32 31 788 A1    3/1984

(Continued)

*Primary Examiner*—Gary L Laxton
(74) *Attorney, Agent, or Firm*—Stacey J. Longanecker; Mark S. Bicks; Alfred N. Goodman

(57) ABSTRACT

A method and apparatus are provided for detecting occupancy in an area using multiple detection technologies (e.g., ultrasound and infrared sensing) to intelligently control switching of plural load circuits whereby one of the circuits is affected by photocell control. A programmable controller implements auto-on, manual-on, reversion to auto-on and override operations with respect to the separately controlled load circuits based on sensor outputs and user inputs. An improved power supply for an occupancy sensor and load control device employs a DC voltage derived from leakage AC voltage between line and ground to drive the sensors and other circuits, and a switching regulator with a switching cycle controlled by a pulse width modulated (PWM) subsystem of the apparatus, allowing synchronous, delayed or exclusive operation relative to the sensing technology such as the US transmitter.

15 Claims, 11 Drawing Sheets

U.S. PATENT DOCUMENTS

| | | | |
|---|---|---|---|
| 5,856,741 A | 1/1999 | Hasegawa | |
| 5,856,905 A | 1/1999 | Eckel et al. | |
| 5,877,614 A | 3/1999 | Huber | |
| 5,946,209 A * | 8/1999 | Eckel et al. | 700/14 |
| 5,984,513 A | 11/1999 | Baldwin | |
| 5,986,357 A | 11/1999 | Myron et al. | |
| 6,078,253 A | 6/2000 | Fowler | |
| 6,262,525 B1 | 7/2001 | Yamamoto et al. | |
| 6,271,651 B1 * | 8/2001 | Stratakos et al. | 323/282 |
| 6,295,212 B1 | 9/2001 | Kayser et al. | |
| 6,307,354 B1 | 10/2001 | Nishihira et al. | |
| 6,466,826 B1 | 10/2002 | Nishihira et al. | |
| 6,472,853 B2 | 10/2002 | Nishihira et al. | |
| 6,487,098 B2 | 11/2002 | Malik et al. | |
| 6,759,954 B1 | 7/2004 | Myron et al. | |
| 7,432,690 B2 * | 10/2008 | Williams et al. | 323/266 |

FOREIGN PATENT DOCUMENTS

| | | |
|---|---|---|
| EP | 0 849 854 A2 | 6/1998 |

* cited by examiner

DUAL CIRCUIT WALL SWITCH OCCUPANCY SENSOR AND METHOD OF OPERATING SAME

This application is a continuation of U.S. patent application Ser. No. 11/138,084, filed May 27, 2005, now U.S. Pat. No. 7,432,690 the subject matter of which is hereby incorporated by reference.

CROSS-REFERENCE TO RELATED APPLICATIONS

Related subject matter is disclosed in U.S. Pat. No. D535,204 of R. Kurt Bender et al.; and in US-2006-0266949-A1 of R. Kurt Bender et al.; the entire contents of each of these applications being expressly incorporated herein by reference.

FIELD OF THE INVENTION

The present invention relates generally to occupancy sensors, and more particularly to an occupancy sensor and load control device for detecting occupancy in an area using multiple detection technologies such as ultrasound (US) and passive infrared (PIR) sensing to intelligently control switching of plural loads. Further, the present invention relates to an improved power supply for use with an occupancy sensor and load control device that employs a DC voltage derived from leakage AC voltage between line and ground to drive the sensors and other circuits, and a buck-type switching regulator with a switching cycle controlled by a pulse width modulated (PWM) subsystem of the US transmitter.

BACKGROUND OF THE INVENTION

An occupancy sensor is designed to detect the presence of a person(s) in a room, usually in order to determine whether various electrically powered loads in that room (e.g., lights, ventilation, and the like) should be turned on or not. This is of particular advantage to institutions that have occupants who are not directly responsible for paying for the electricity they consume, since these people often do not exercise diligence in regularly turning off electrically powered loads such as lights, ventilation, and the like, when they leave a room. Occupancy sensors may therefore provide a means to conserve a significant amount of energy. This has led many businesses to purchase occupancy sensors voluntarily. This potential for energy savings has also resulted in laws being passed in certain states that mandate the use of occupancy sensors in large areas as an environmental conservation measure.

Some state and local energy conservation/building codes require installation of two light switches in the construction or reconstruction of offices, each to control a different portion of the overhead lighting. The reasoning behind such a requirement is that, in the interest of energy conservation, employees and janitorial personnel have the opportunity to use approximately one half of the light they would normally require in their day-to-day activities. Depending upon the amount of ambient light available, employees working in a room may select to use only one half of the available bank or banks of lights.

Further, employees may customize their specific lighting needs to their activities and location in the room. For example, employees working in an area not receiving sufficient ambient light may require more artificial light, depending upon their specific activities. Similarly, employees located in an area receiving sufficient ambient light may require less artificial light. Utilizing office lighting effectively (e.g., using only one-half of the available lighting, and using lighting only in occupied offices) results in substantial energy savings. In addition, for computer applications, it is advantageous to reduce the level of light to eliminate the glare on cathode ray tubes (CRT).

Conventional manual switches are inefficient because they depend upon human judgment to turn all or only a portion of the lights on and off. Existing automatic wall switches are more efficient, but still make errors, and have less than optimal sensitivity.

Commercially available occupancy sensors and load control units have been designed to replace existing wall switches in commercial and private applications. These units typically include load switching devices that replace the mechanical switch contacts found in a manually-operated switch. These load switching devices may include relays, SCRs, Triacs, transistors, or other electrical load switching devices that may be controlled by power control circuitry including, for example, a programmable controller, or the like. Many of these replacement units require a power supply for the power control circuitry that must supply power to the control circuitry whether or not the load switching device is in the on-state or the off-state. The wiring that exists in the existing switch enclosures, the mechanical constraints imposed by the existing switch enclosures, and the constraints presented by the existing loads cannot be easily altered and must be tolerated by the unit that is replacing the existing switch.

Units that have been designed as replacement devices for existing switches range from simple dimmer switches to intelligent lighting systems with microprocessor control. Commercially viable replacement units for business or residential locations are preferably low cost, robust, small in size, meet stringent safety considerations, as well as have low electrical power dissipation, and attractive physical features. In addition, the replacement unit's contacts preferably emulate the simple mechanical air gap switch it replaced. The replacement unit should also have a similar voltage drop when the contacts are closed, essentially zero leakage current through the contacts when the contacts are open, and guarantee safety from hazardous voltages when the contacts are open. Underwriters Laboratories (UL), the National Electrical Manufacturers Association (NEMA), the National Electrical Code (NEC), and other electrical safety organizations and documents, generally agree that 0.5 milliamperes (mA) of electrical current may pass through the human body without creating hazard of electrical shock. This current level has been established as a safety standard for electrical current leakage that may incidentally occur in an electrical device. Various manufacturers of automatic wall switch type devices have utilized this allowable leakage current as a power source for the device.

A number of load control devices and/or power supplies for use with load control devices are described in commonly-assigned U.S. Pat. Nos. 5,821,642, 6,307,354, 6,466,826 and 6,472,853 to Nishihira et al, U.S. Pat. No. 5,774,322 to Walter et al, U.S. Pat. Nos. 5,777,837 and 5,856,905 to Eckel et al, and U.S. Pat. No. 6,262,565 to Williams et al, which are each hereby incorporated herein by reference. U.S. Pat. No. 6,262,565, to Williams et al, provides a power system for an electrical load switch that replaces the simple mechanical contacts of a wall switch with those elements necessary to power control circuitry, provide controllable contacts, ensure thermal stability in a wall switch enclosure, control the off-state leakage current to ensure safe and robust operation of sensitive loads, and provide a safety device to guarantee that a no leakage off-state exists to protect a maintenance person from voltage potential with respect to neutral during load replacement. As with many power systems used with existing occupancy sensors, however, the power system disclosed in U.S. Pat. No. 6,262,565 employs a power supply in series with the load. This is often advantageous in retrofit situations where the sensor power supply and relay are connected into existing lighting circuits in the most expedient way, as a replacement for the manual wall switch in the portion of the circuit already switched at the wall.

These types of power supplies are disadvantageous because they allow a small amount of current to flow in the load in off state, and that current may cause malfunction of certain electronic lamp ballasts. These types of power supplies are also disadvantageous because they require a minimum amount of current flow to function with the load in the on-state, and because it is difficult for a single design to accommodate a large range of load current levels. Active sensing requires power to transmit. A need therefore exists for an improved power supply for occupancy sensors that does not require a minimum load but can provide enough power for an active motion sensor. A need also exits for a system that physically fits in the space allotted for a wall switch without the power supply negatively affecting the motion sensor.

SUMMARY OF THE INVENTION

The present invention overcomes the disadvantages of existing occupancy sensors and power supplies therefore and realizes a number of advantages. In accordance with the present invention, a method and apparatus are provided for supplying power to an occupancy-based load controller. The method comprises the steps of: (1) applying power to a current limiting circuit, the current limiting circuit being configured to limit leakage to ground current to a selected level; (2) accumulating charge in a capacitance circuit disposed at the output of the current limiting circuit; (3) selectively controlling discharge of the capacitance circuit into a power rail for powering a load connected between the power rail and ground; and (4) receiving a pulse signal. The selectively controlling step comprises providing current discharged from the capacitance circuit to the power rail during a first portion of the pulse signal and interrupting the supply of current discharged from the capacitance circuit to the power rail during a second portion of the pulse signal.

In accordance with another aspect of the present invention, the pulse signal is periodic and comprises cycles each having the first portion and the second portion therein. The selectively controlling step comprises the step of switching current from the storage element on and off with the occurrence of each of the first and second portions, respectively.

In accordance with yet another aspect of the present invention, the method further comprises the step of operating an active occupancy detector configured to transmit occupancy detection signals at the same frequency, and with a programmable substantially fixed delay to the first portion of the pulse signal.

In accordance with still yet another aspect of the present invention, the selectively controlling step comprises the step of switching current from the storage element on and off with the occurrence of each of the first and second portions, respectively.

In accordance with the present invention, transfer of power to the power rail is controlled using a processing device, and power is supplied to the processing device via the power rail. A start up power circuit is configured to provide initial current to the processing device for start up until the processing device receives power via the power rail.

In accordance with an aspect of the present invention, a power supply for a load controller is provided that comprises a rectifier circuit having a first input terminal connected to the hot terminal of an AC power source, a second input terminal connected to one of ground and neutral, and a third output terminal and a fourth output terminal connected to a DC high voltage rail and a DC return rail respectively. The power supply further comprises a current limit circuit connected to the rectifier circuit and comprising a current limiting device and a first capacitor. The current limiting device is configured to limit a corresponding one of the leakage current to ground and the leakage current to neutral, to a selected level. The power supply also comprises a regulator. The first capacitor is connected across the regulator, and the regulator comprises a DC power input, a control input for receiving a pulse signal, an output comprising a DC power rail operable to provide power to a DC load when the DC load is connected with one terminal thereof to the DC power rail and another terminal thereof to a DC return. In addition, the regulator comprises a main switch and an energy storage device connected between the DC power input and the DC power rail, and a control switch. The control switch controls operation of the main switch to be selectively opened and closed in accordance with the pulse signal. The energy storage device provides power to the DC power rail when the main switch is open.

In accordance with another aspect of the present invention, the energy storage device is an inductor.

In accordance with yet another aspect of the present invention, the pulse signal is a periodic signal that comprises a first portion and a second portion in each cycle thereof. The main switch is operable to close and open in response to the first portion and the second portion, respectively. The main switch being closed and providing power to the DC power rail substantially synchronously with operation of an occupancy sensor for the load controller during the first portion of the pulse signal. For example, wherein the occupancy sensor comprises an ultrasonic sensor, the control second switch controls switching of the main switch in accordance with the pulse signal to reduce interference with the ultrasonic sensor.

In accordance with still yet another aspect of the present invention, the pulse signal is a periodic signal that repeats at the same frequency as the sender transducer of the ultrasonic sensor In accordance with still yet another aspect of the present invention, the first portion of the pulse signal is generated at a selected phase difference with respect to operation of an occupancy sensor for the load controller.

In accordance with another aspect of the present invention, the power supply comprises a shunt regulator between the DC power rail and ground or DC return.

In accordance with yet another aspect of the present invention, the voltage on the first capacitor is determined via the duty cycle of the main switch as controlled by the pulse signal.

In accordance with still yet another aspect of the present invention, the control switch is configured to receive a pulse signal generated via a microcontroller, and the power supply is operable to power the microcontroller when connected to the DC power rail.

In accordance with yet another aspect of the present invention, the power supply further comprises a start up pulse generator circuit connected to the regulator and configured to supply initial microcontroller current. A start up inhibit circuit can be connected to the start up pulse generator circuit to prevent operation thereof once the pulse signal is generated by the microcontroller.

In accordance with still yet another aspect of the present invention, the regulator is a buck-type regulator.

In accordance with another aspect of the present invention, power supply is operable to limit the leakage current to ground or leakage current to neutral to 0.50 milliamperes or less.

BRIEF DESCRIPTION OF THE DRAWINGS

For a more complete understanding of the invention and advantages of certain embodiments thereof, reference is now made to the following description taken in conjunction with the accompanying drawings, which form a part of this application and in which.

Throughout the drawings, it should be understood that like reference numbers refer to like features, structures and elements.

DETAILED DESCRIPTION OF THE EXEMPLARY EMBODIMENTS

Figure 1:
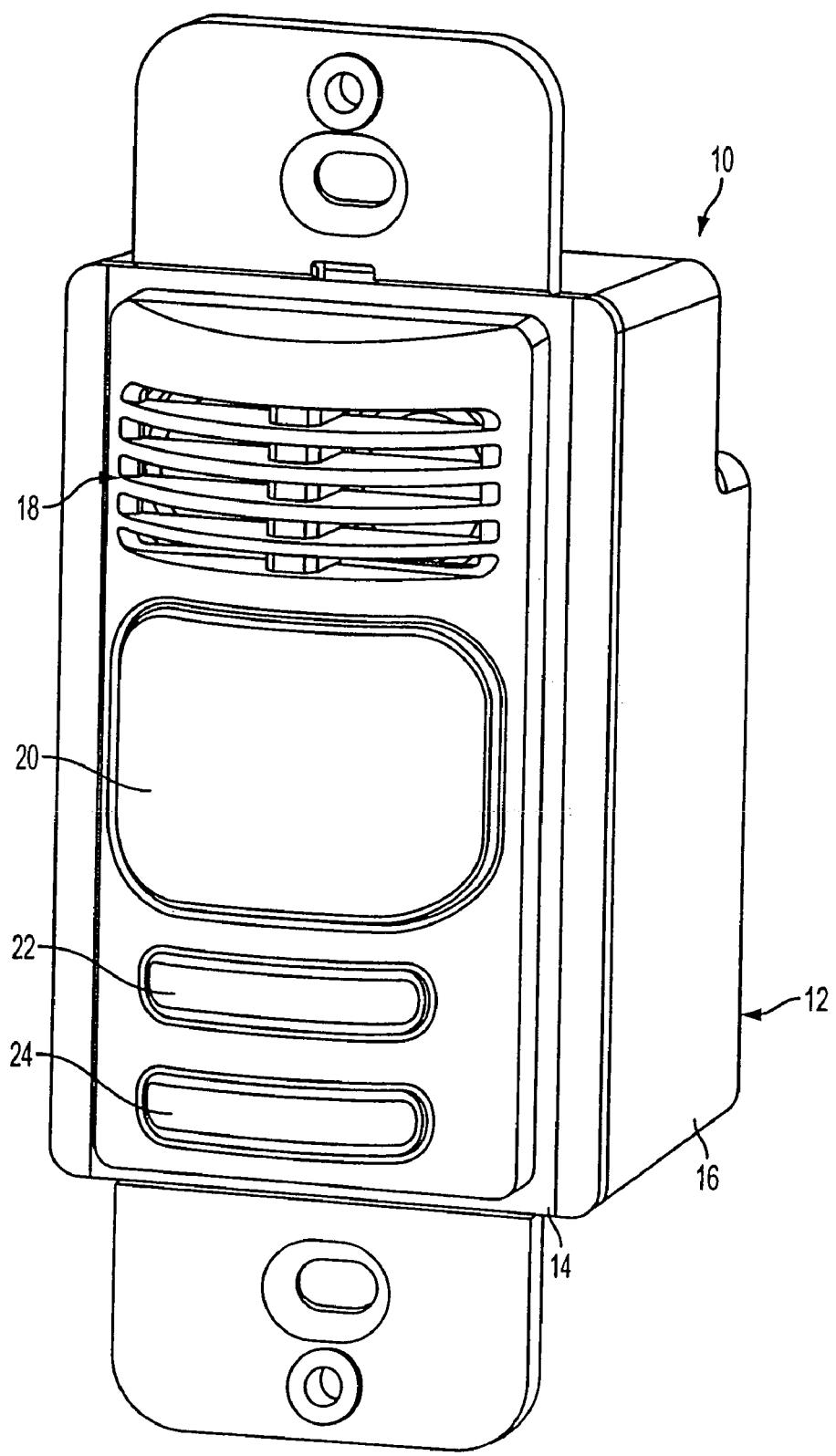
FIG. 1 is a front right side perspective view of a dual circuit wall switch occupancy sensor device constructed in accordance with an embodiment of the present invention.
Figure 2:
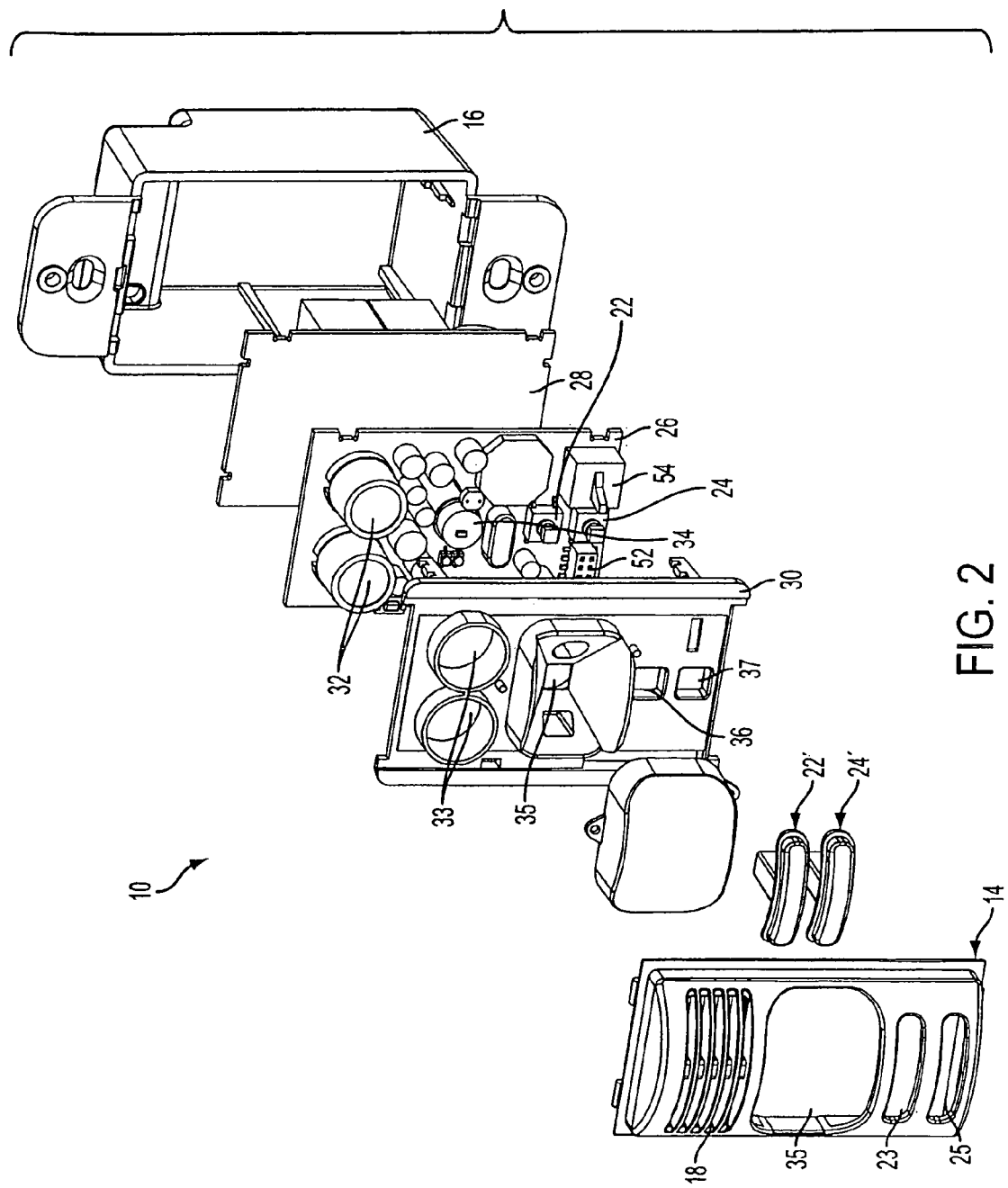
FIG. 2 is a exploded perspective view of the dual circuit wall switch occupancy sensor device shown in FIG. 1.

FIGS. 1 and 2 depict a dual circuit wall switch occupancy sensor device 10 in accordance with an embodiment of the present invention. The dual circuit wall switch occupancy sensor device is used to automatically control at least two lighting circuits (hereinafter referred to respectively as "circuit A" and "circuit B") based on detection of human occupancy in a room. A lighting circuit can comprise one or more lamps. As stated above in the background, a device configured to control more than one lighting circuit in a room has the potential to reduce energy consumption by controlling, for example, one of plural lighting circuits that is deployed near a window or door to remain off when natural lighting or ambient light conditions near the window or door is sufficient for a user. It is to be understood, however, that the device can be configured to control more than two lighting circuits.

The device 10 preferably retrofits or mounts in an opening for a conventional electrical wall box such as that used for a conventional manual light switch. The device preferably operates from AC line voltage to directly switch the lighting loads. In the following description, a detailed description of known functions and configurations incorporated herein has been omitted for conciseness. Exemplary automatic wall switches having similar known functions and configurations are disclosed in U.S. Pat. Nos. 5,640,143, 5,986,357, 6,078, 253 and 6,759,954, all to Myron et al (assigned to the same assignee as the present invention) and U.S. Pat. No. 5,189, 393, to Hu, the disclosures of which are hereby incorporated herein by reference.

Physical Circuit Partition

With continued reference to FIG. 1 and the exploded diagram in FIG. 2, the mechanical and design aspects of the dual circuit wall switch occupancy sensor device 10 are described in the above-referenced co-pending applications. Briefly, the device 10 comprises a housing 12 with a face plate 14 and main body 16 that can be inserted into an opening in a wall or other surface configured to receive a conventional wall switch for controlling a load (e.g., lighting). The face plate 14 is configured to be essentially flush with the wall following installation and comprises a grill 18 through which ultrasound signals can be transmitted and received, as well as an aperture 20 for a lens used in connection with a passive infrared sensor, for occupancy detection using preferably US and PIR technologies. The face plate also comprises aperture 23 and 25 for two buttons 22 and 24 and their respective button covers 22' and 24' for manual control of each of the two lighting circuits.

With reference to FIG. 2, the device 10 has a number of board and plate assemblies that are arranged together in a housing with a face plate. A sensor board 26 implements the sensor circuitry for the US and PIR sensors, including sensor elements, analog sensor circuitry, and microcontroller 38. The sensor board 26 is mounted to the front of the wall switch, with ultrasonic and infrared transducers projecting forward toward the room, along with installer and user controls. The schematic diagrams for the US and PIR sensors are provided in FIGS. 8, 9 and 10.

A power board 28 implements the power supply, and lighting load switching circuitry. The power board 28 is mounted toward the rear of the wall switch. The sensor and power boards 26 and 28 are connected through a header (not shown). The sensor board 26 communicates relay control signals and a power supply oscillator signal to the power board 28. The power board 28 provides DC power and an AC voltage zero-crossing signal to the sensor board 26. The schematic diagram for the power board 28 is provided in FIG. 3, and the relays for load control of the two lighting circuits A and B are depicted in FIGS. 4A and 4B. The power supply circuit 48 on the power board 28 employs a buck-type switching regulator. In accordance with an aspect of the present invention, the switching regulator is operated synchronously with the ultrasonic sender-detector circuit on the sensor board 26 to avoid creating energy that could possibly be detected erroneously as noise in ultrasonic return.

Finally, a cover plate 30 is provided between the face plate 14 and the sensor board 26 with apertures 36 and 37 for the two manual control buttons for controlling respective lighting circuits A and B, as well as apertures 33 and 35 for the US transducers 32, and the optical signals from the lens 34.

IR Sensor

Figure 8:
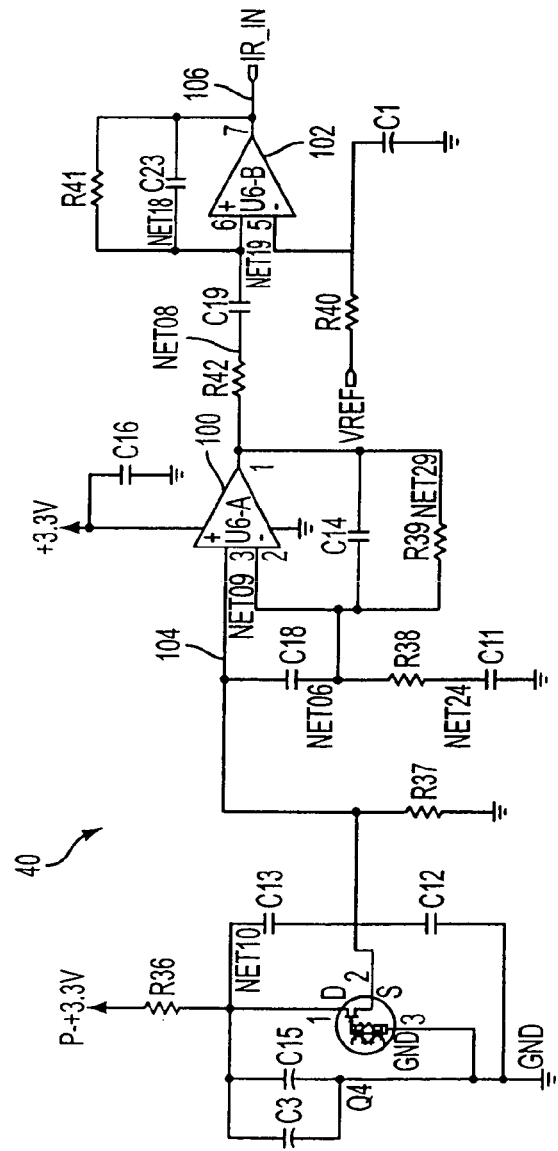
FIG. 8 is a schematic diagram of an infrared sensor circuit constructed in accordance with an embodiment of the present invention.

The infrared (IR) sensor circuit 40 on the sensor board 26 preferably comprises a Fresnel lens 34, a pyroelectric detector, bandpass amplifiers, an analog-digital converter (ADC) (e.g., a ADC provided inside the microcontroller), and an IR sensor algorithm running on a microcontroller 38 on the sensor board 26. The infrared sensor circuit 40 is depicted in FIG. 8.

Ultrasonic Sensor

Figure 9:
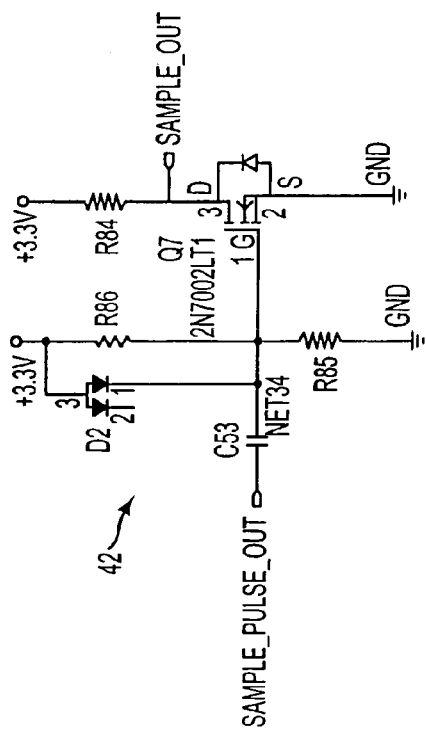
FIGS. 9 and 10 are, respectively, schematic diagrams of ultrasound transceiver and receiver circuits constructed in accordance with an embodiment of the present invention.
Figure 10:
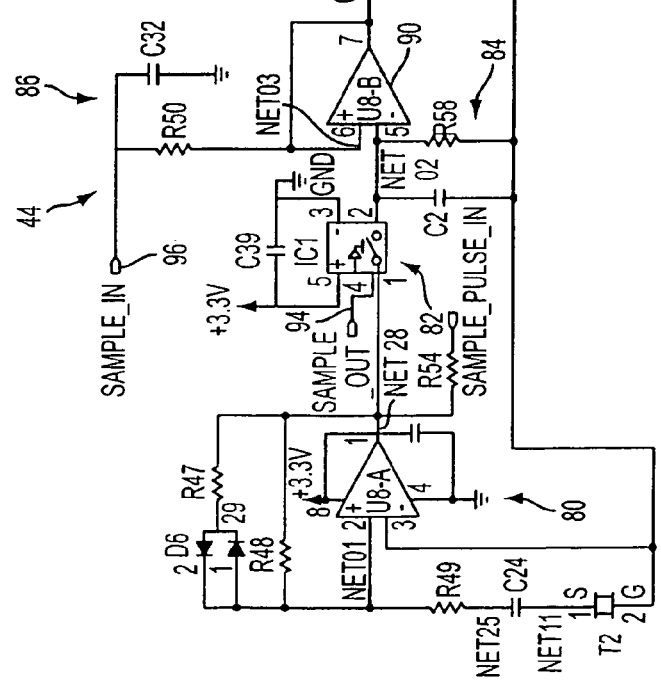

The ultrasonic (US) sensor circuit uses active Doppler ultrasonic detection to sense motion in the controlled space. It consists of a 40 KHz sender transducer or US transmitter circuit 42, and a US receiver circuit 44 comprising a 40 KHz receiver transducer and an amplifier, a synchronous sample-point mixer, a Doppler signal bandpass amplifier, a analog-digital converter inside the microcontroller 38, and a US sensor algorithm running on the microcontroller 38. The ultrasonic detector circuits 42 and 44 are depicted in FIGS. 9 and 10, respectively.

Photocell Sensor

Figure 7:
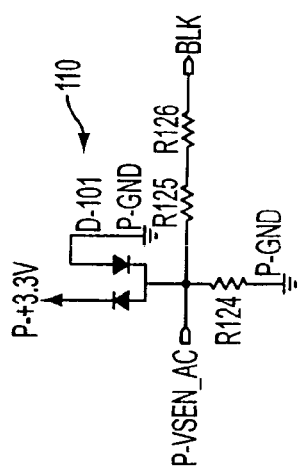
FIG. 7 is a schematic diagram of zero-crossing detection circuit constructed in accordance with an embodiment of the present invention.

A photocell circuit 46 is also provided on the sensor board 26 and preferably comprises a cadmium-sulfide photo-resistor or other light-to-current translation device, biasing circuitry, an analog-digital converter available inside the microcontroller 38, and a photocell sensor algorithm running inside the microcontroller. The photocell circuit 46 is depicted in FIG. 7. The photocell algorithm implements lighting circuit turn-off (e.g., of circuit B as shown in the illustrated embodiment) based on increased ambient light level, as well as turn-on based on decreased light level, among other features and is described in more detail below in connection with the dual circuit wall switch occupancy sensor device 10 control algorithm.

Microcontroller

The microcontroller 38 is a digital microprocessor that preferably comprises an analog-digital (A/D) input subsystem, and a pulse-width modulation (PWM) output subsystem, as well as general purpose input/output (I/O) pins. For example, the microcontroller 38 can be a model MSP430 available from Texas Instruments Incorporated, Dallas, Tex. As stated above, the microcontroller 38 is depicted in the sensor board schematic provided in FIG. 5. The microcontroller performs occupancy detection algorithms based on sensor signals from the A/D input pins, and controls the relays through I/O pins. The microcontroller 38 also drives the ultrasonic transducers 32 and the power supply switch through PWM outputs. As stated previously, the power supply switching regulator 66 on the power board 28 is operated synchronously with the ultrasonic sender-detector circuit 42 to avoid creating energy that could possibly be detected erroneously as noise in ultrasonic return. In each switching cycle of the power supply switching regulator 66, the on-time of a switch in the power supply regulator 66 is set by a pulse from the microcontroller PWM subsystem. Accordingly, the switching cycle repeats at a 40 kHz rate.

Power Supply

Figure 3:
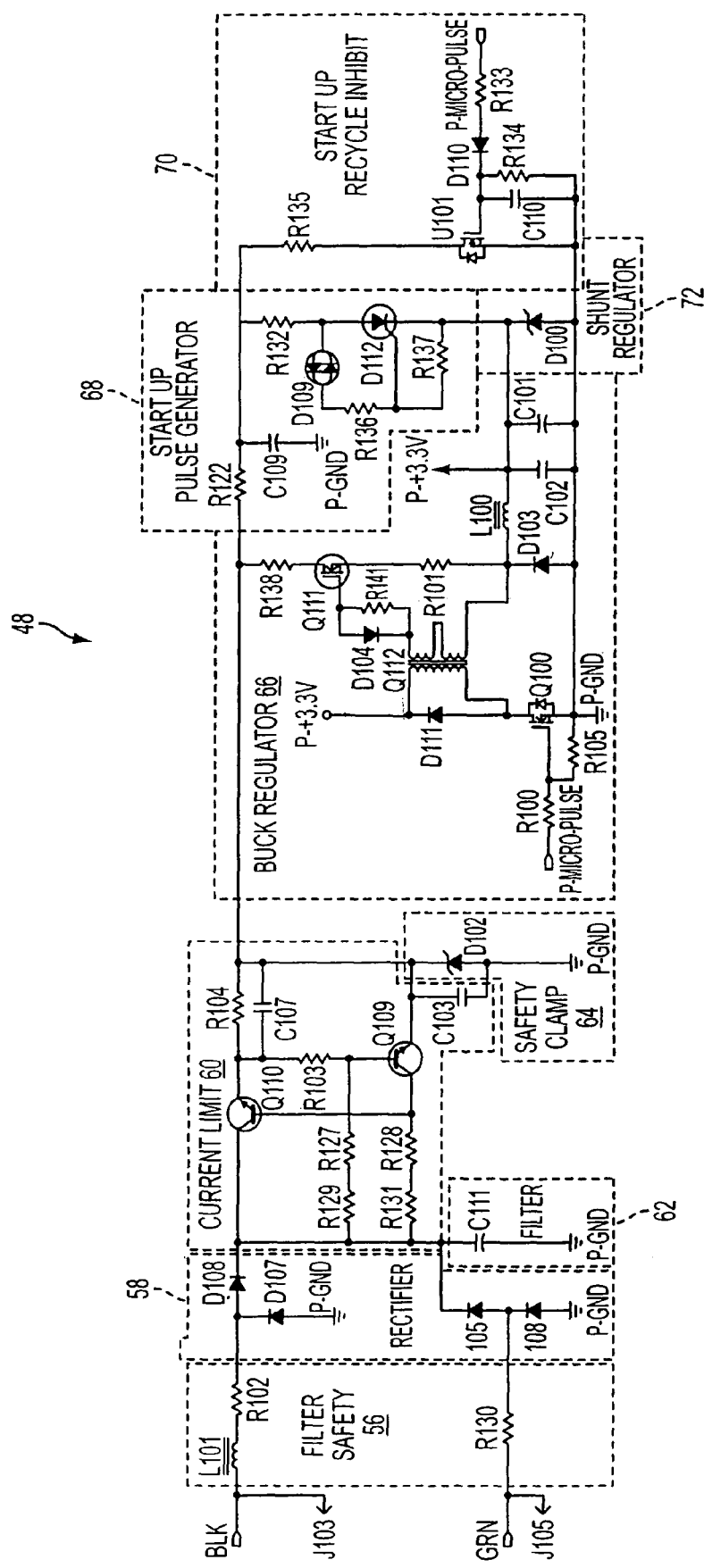
FIG. 3 is a schematic diagram of a switching power supply circuit constructed in accordance with an embodiment of the present invention.
Figure 4A:
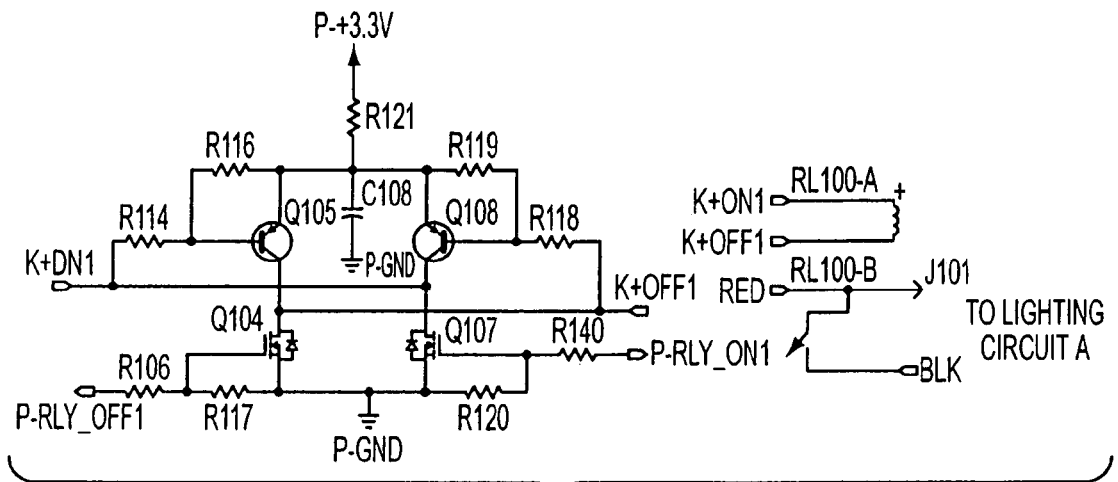
FIGS. 4A and 4B are schematic diagrams of relay and relay control circuits constructed in accordance with an embodiment of the present invention.
Figure 4B:
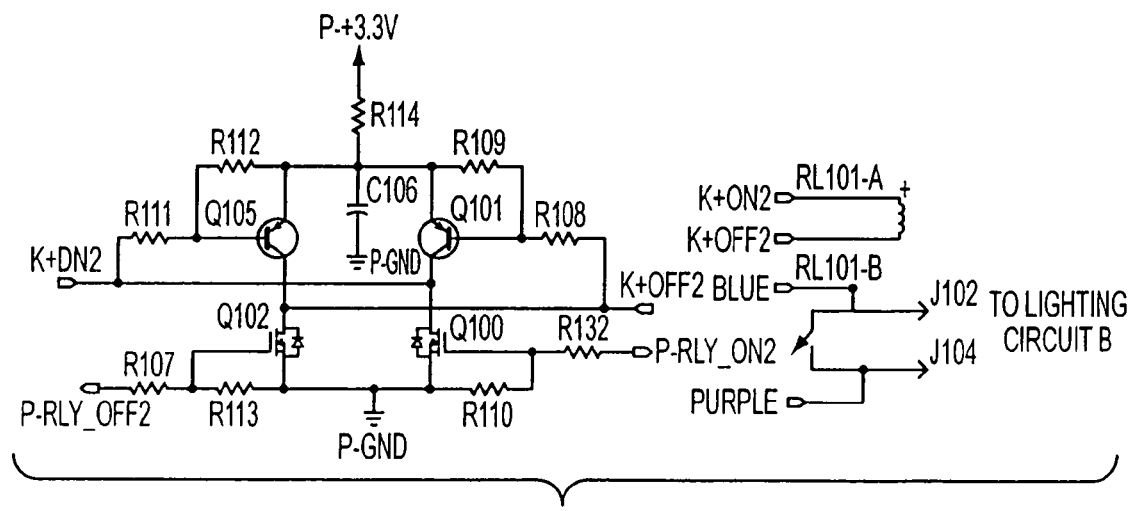

The power supply circuit 48 on the power board 28 is depicted in FIG. 3. The power supply circuit 48 derives its power input from the AC line, leaking a small amount of line voltage current to ground. Alternatively, a power supply circuit 48 can operate with current leaked to neutral. From an electrical standpoint, ground and neutral are equivalent in terms of operating the power supply circuit; however, from a wiring standpoint, power supply circuits employing leakage of current to ground and neutral, respectively, are implemented using different connection points that will be apparent to one of ordinary skill in the art. This parasitic leakage current is constrained by safety concerns not to exceed 0.5 milliamperes (mA). The occupancy sensor subsystem (e.g., sensor board circuits 40, 42 and 44) operates from 3.3V at a current considerably greater than 0.5 mA. The power supply circuit 48 operates as a switching power converter to transform a high voltage at low current to a low voltage at higher current, maintaining good efficiency through the transformation. The power supply circuit 48 is described in more detail below in connection with the power schematic depicted in FIG. 3.

Relay Control

The device 10 preferably comprises two relays RL100 and RL101 as shown in FIGS. 4A and 4B (e.g., on the power board 28) for controlling, respectively, the two individual lighting circuits A and B. The algorithm for controlling operation of the individual relays is described below in connection with the dual circuit wall switch control algorithm.

AC Zero-Crossing Sense

AC voltage zero-crossing is sensed and forwarded to the sensor board 26 by the circuit 110 comprising diode D101 and resistors R124, R125 and R126 depicted in FIG. 7. Resistors R126 and R125 limit current for the zero voltage-crossing sense circuit. Diode pair D101 are added protection for the corresponding microcontroller pin. Resistor R124 preferably weakly biases the pin to P-GND. The closures of relays RL100 and RL101 (i.e., in FIGS. 4A and 4B) are timed based on the samples from the zero voltage-crossing sense circuit. Operation of the relay coil drive circuits, also shown in FIGS. 4A and 4B, will result in charge loss from the relay storage capacitors C105 and C106, respectively. The sensor board microcontroller 38 times the duration of, and time between, the relay pulses to maximize the switching time within the storage capacitor constraints.

User Controls

A number of control buttons are accessible from the face plate or fascia 14, as shown in FIGS. 1 and 2. These control buttons include, but are not limited to, user pushbuttons 22 and 24 to manually turn on/off lighting circuit A (e.g., the lower button) and lighting circuit B (e.g., the upper button). These control buttons are preferably provided on the sensor board 26 and extend through corresponding apertures in the cover plate 30 and face plate 14 as described above.

Figures 1, 5A:
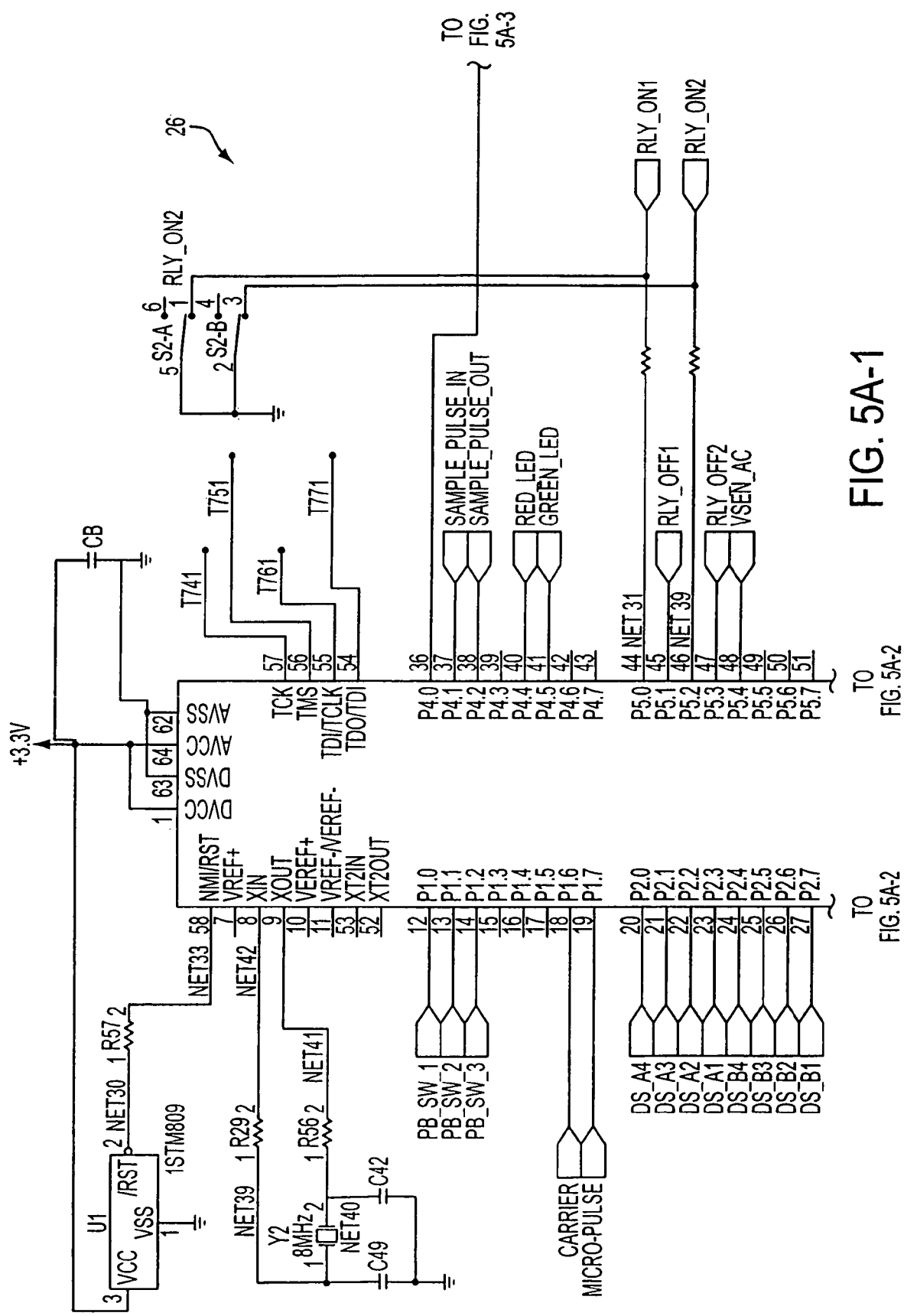
FIGS. 5A, 5B, 5C and 5D are schematic diagrams of circuits for implementing a microcontroller-based sensor board with dual technology sensing and user controls in accordance with an embodiment of the present invention.
Figures 3, 5A:
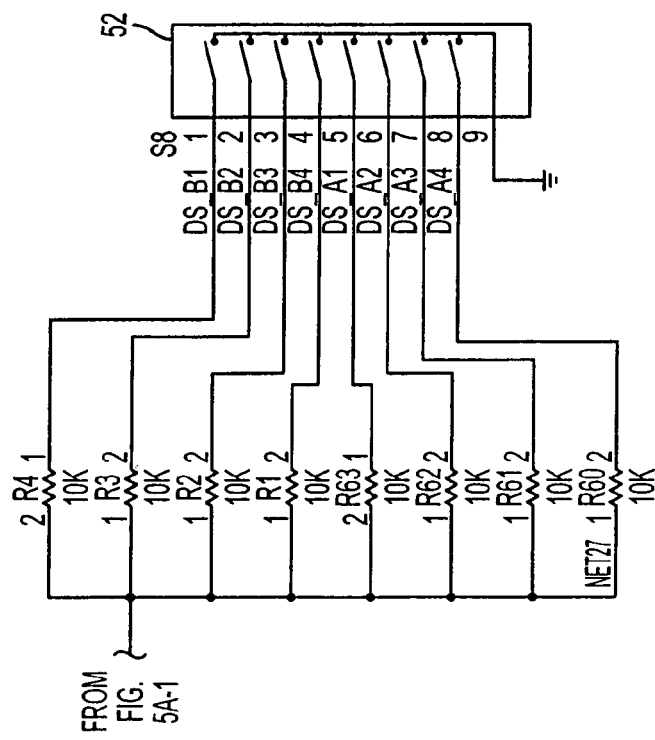
Figures 2, 5A:
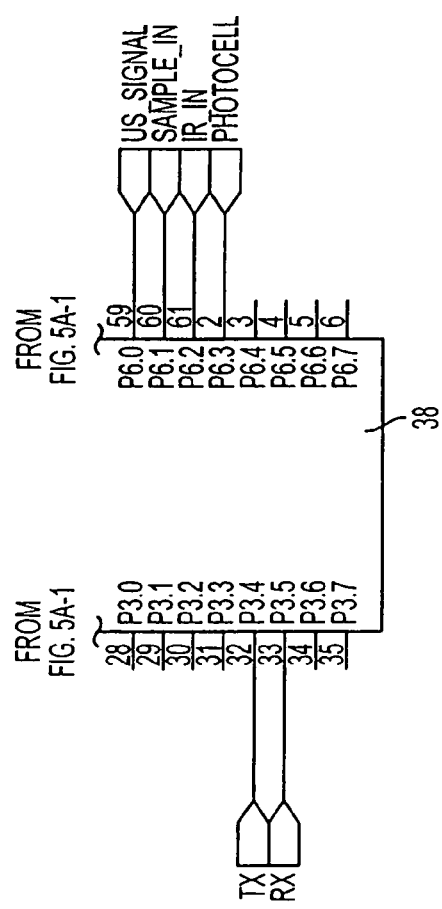
Figure 5B:
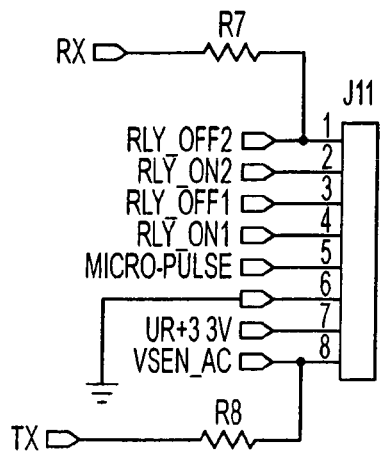
Figure 5C:
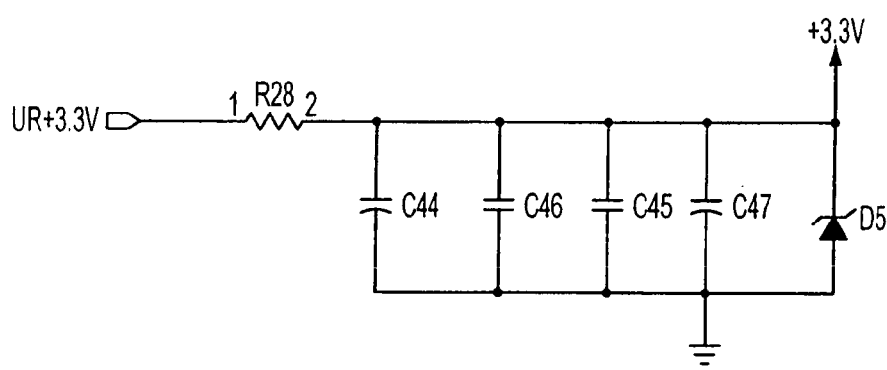
Figure 5D:
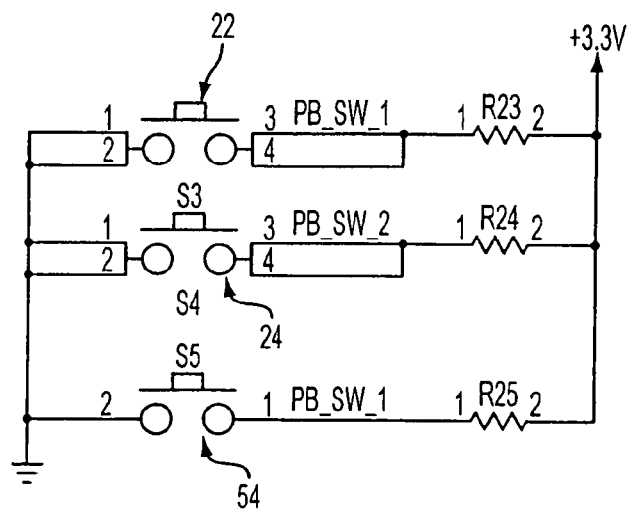

In addition to face plate user controls, a number of hidden installer/maintenance control buttons and/or switches are provided. These hidden installer/maintenance control buttons and switches are provided, by way of an example, on the sensor board 26 and are preferably accessible only after first removing the cover plate 30 and fascia or face plate 14. The hidden installer/maintenance control buttons and switches are preferably implemented as Mode Switches 52 (e.g., 8 switches total) that include, but are not limited to:

A Mode: automatic or manual
    B Mode: automatic or manual
    Photocell Mode: continuous or turn-on only
    Timer Setting: 2 switch poles
    Timer Mode: fixed or automatic
    Sensitivity: normal or high confidence
    Reset Adapted Values
    Pushbutton Switch-photocell setpoint In addition, a maintenance mode switch 54 is provided (e.g., on the sensor board 26 as shown in FIG. 2) that defeats relay closure to comply with a UL requirement for automatic light switches. This safety disable switch 54, as required by electrical code, puts the dual circuit wall switch occupancy sensor device 10 in a maintenance cutoff mode and prevents either relay RL100 or RL101 from being energized. This disable switch is preferably accessed only by an electrician, with the wall plate front cover or fascia removed. With reference to FIGS. 5A and 5D, the signals from the push buttons 22, 24 and 54 and the mode switches 52 are provided as inputs to the microcontroller 38. FIG. 5B depicts a jumper for providing control signals such as the micropulse signal or relay control signals (i.e., RLY_ON1, RLY_OFF1, RLY_ON2, and RLY_OFF2) for relays RL100 and RL101 to other parts of the device 10 such as the power board 28. FIG. 5C depicts components for filtering the output voltage of the power supply circuit 48 for connection to the control circuit that controls the lighting circuits A and B via the relays RL100 and RL101, as shown in FIGS. 4A and 4B, respectively.

The microcontroller 38 receives signals from these switches 52 and is programmed to operate in a selected manner corresponding to information relating to the states of the switches. A description of the control operations of the microcontroller 38 and related circuits will now be discussed.

For example, when the A Mode or B Mode switch is set to "auto" for automatic operation, the corresponding circuit A or B operates in an Auto On mode whereby the device 10 turns lights on when occupancy is initially detected (i.e., via operation of the US and/or PIR sensor). When the A Mode or B Mode switch is set to "manual" for manual operation, the corresponding circuit A or B operates in an Manual On: mode whereby the device 10 does not switch lights on when occupancy is initially detected. In other words, an occupant must manually turn the lights corresponding to circuit A or B on via the front plate pushbuttons. Accordingly, the device 10 is configurable to operate in an Auto-On or a Manual-On mode for automatic-on or manual-on operation. In automatic-on mode, the device turns the lights on automatically upon detecting occupancy. The lights are automatically maintained on and then turned off upon occupancy timeout. In manual-on mode, the occupant must manually turn on the lights upon entering the space, after which the lights are automatically maintained on and then turned off upon occupancy timeout.

Regardless of the auto/manual switch settings for circuits A and B, the microcontroller 38 is programmed to operate corresponding relays RL100 and RL101 to close and thereby turn lights off when an occupancy timer has expired. Thus, the device 10 implements an Auto Off mode as its normal behavior mode. A Manual Off mode is provided, however, whereby an occupant may turn lights off using manual control (i.e., the front panel pushbuttons). Further, a Reversion to Auto-On operation is provided. After a user turns a lighting circuit A or B off manually via the front panel pushbuttons, the device 10 reverts to automatic-on mode after an occupancy timer times out. This function allows a user to force lights off for particular circumstances regardless of the auto/manual switch settings for circuits A and B. This functionality is achieved without the need for any load current. Loads A and B may be disconnected without affecting the operation of the unit. Active ultrasonic sensing is taking place without load current.

With regard to photocell mode setting via a corresponding one of the switches, the operation of the lighting circuit B can be affected by the detected ambient light level either continuously or only for turn-on purposes. In other words, unlike continuous mode operation whereby the circuit B can be powered down if sufficient ambient light is detected, the turn-on only setting of the photocell control switch causes the circuit B to be prevented from operating only if sufficient ambient light is detected upon a turn-on operation.

The microcontroller 38 is programmed with an occupancy sensor algorithm that adjusts the "confidence level" against which the sensor readings are compared in order to determine occupancy. A gain setback is preferably implemented to change between confidence levels required to keep lights on versus those required to turn them on originally, as described in the afore-mentioned U.S. Pat. No. 5,640,143. Accordingly, the US and PIR sensors in device 10 operate in accordance with a Gain Set-Back with low sensitivity at initial turn-on, followed by higher sensitivity after turn-on, to avoid false trips in an occupied space. The gain set-back takes advantage of the fact that a wall switch occupancy sensor device will necessarily see a large occupancy signal when a person enters the room through the doorway. The sensitivity can thereafter be higher to detect smaller movements that can be typical of occupants who have occupied an area for some time (e.g., have been sitting relatively still to read and therefore may not be detected by an occupancy sensor circuit with low sensitivity). The sensitivity switch can be set to normal mode whereby the gain set-back is not employed or to a high confidence mode whereby the gain set-back is used.

The microcontroller 38 operates to turn off lighting circuits A and B automatically after no motion is detected for a selected time period hereinafter referred to as a time out period. In addition, the microcontroller 38 is programmed to operate the lighting circuits in accordance with a grace period. After automatically turning lights off, the microcontroller 38 times a grace period (e.g., 10 seconds or so) during which it maintains an on-state sensitivity setting (i.e., a higher confidence level). Thus, if a decision error was made and the lighting circuit(s) A and/or B were disabled erroneously (e.g., the area is still occupied), an occupant has the opportunity to wave his or her hand, for example, for occupancy detection purposes and make the device 10 turn the lighting circuit(s) on again.

The time period can be a fixed duration or can be variable and automatically adapted based on occupancy detection patterns. The timer setting switch permits a user to select initial time duration for the time out period and the grace period. The timer mode (fixed/automatic) switch determines if the selected time out period will be of fixed duration (i.e., fixed timer mode) or will vary due to adaptive behavior based on detected occupancy (i.e., automatic timer mode).

Finally, the controls comprise a switch to reset adapted values such as the time out period or occupancy sensor circuit confidence levels, and a switch (e.g., a pushbutton switch) for the photocell setpoint. Adaptation procedures for these and other settings are described in more detail below.

Operation of Lighting Circuits

The operation of the lighting circuits A and B will now be described in more detail. In general, circuit A is the primary lighting circuit, and is therefore not daylight controlled. Circuit B preferably operates as an auxiliary lighting source when daylight is insufficient. Thus, as stated above, photocell control preferably affects only circuit B.

Turn-On

Turn-on operation of circuits A and B is set by a combination of the two switches 22 and 24 depicted on the face plate in FIG. 2, and the hidden installer/maintenance control buttons 52 and 54 (e.g., implemented as mode switches 52) for circuit A auto/manual turn-on mode and circuit B auto/manual turn-on mode. Table 1 describes the operation of the lighting circuits A and B in accordance with different combinations of these settings.

TABLE 1

| Circuit B Turn-on Mode | Circuit A Turn-on Mode | |
|---|---|---|
| | Auto | Manual |
| Auto | A turns on with occupancy B turns on with occupancy if low ambient light or photocell defeated | A must be turned on manually B turns on automatically if low ambient light or photocell defeated |
| Manual | A turns on with occupancy B must be turned on manually, no photocell control | A must be turned on manually B must be turned on manually, no photocell control |

Overrides

Either circuit A or B may be overridden from its automatic mode. Once overridden, if the switch 22 or 24 is toggled again, the circuit remains in a manually-controlled condition. Pushbutton control of a circuit preferably never causes that circuit to revert to automatically controlled condition. Any manual override of an automatic setting persists while the space is occupied. All manual control of circuits is reset to defaults after occupancy expires. In other words, if lights are turned off manually (i.e., using a front panel pushbutton), the lights stay off as long as occupancy is still detected. The lights can be turned on again manually. If occupancy is detected during the time out period, the microcontroller 38 is programmed to start the time out period over again. After the time out and grace periods expire with no motion detection and the lights turned off, the sensor returns to turn-on behavior guided by the mode switches, the photocell light level setting, and the measured light setting.

Photocell Behavior

A photocell circuit 46 can be defeated (e.g., for an as-shipped default mode) to operate as if sensing insufficient ambient light, causing lighting circuit B to turn on if not otherwise prevented by the circuit B mode switch. Photocell-controlled behavior at an event such as initial occupancy sense is based on a pre-event lights-off illumination state. During occupancy, photocell-controlled behavior is preferably a continuous function of light level, that is, circuit B turns on with insufficient light and turns off when more than sufficient light exists.

Photocell behavior is preferably predictable based on a post-event illumination state. Circuit B should not remain off when lighting circuit A turns on automatically, and then turn on shortly thereafter due to an initial over-estimation of light level with circuit A on. In addition, circuit B should not turn on with circuit A upon initial occupancy detection, and then turn off shortly thereafter due to initial under-estimation of light level with circuit A on. Most importantly, circuit B must not enter an oscillatory state due to under-estimation of the contribution of light by the circuit B circuit. The above-described control buttons allow for photocell control to prevent such undesirable operation of lighting circuit B. For example, a photocell setpoint switch is provided. When the photocell setpoint button is pressed, the dual circuit wall switch occupancy sensor device 10 will switch individual lighting circuits A and B on and off and determine photocell trip points for the respective conditions of all off, circuit A on, and circuits A and B on.

Certain situations will result in undesirable oscillatory behavior, as stated above, even for a system that is properly designed and installed. For instance, a change in local reflectance can cause more circuit B lighting to be reflected back toward the photocell, resulting in cyclical oscillation. Also, occupants have historically complained about photocell-controlled turn-off of their lights. The present invention addresses both of these issues by providing a mode setting that only allows the photocell to turn circuit B on and never off. If this mode is selected (e.g., the above-described switch setting for turn-on only photocell mode), circuit B is only automatically turned off at the end of occupancy.

Turn-Off

Manually turning lighting circuit A off via the front panel pushbutton 22 might cause the photocell control logic of the microcontroller to determine that less light has been detected and turn circuit B on. This would be frustrating, since the occupant evidently wants the lights off. Turning circuit A off means that the occupant wants the lights off, and therefore overrides automatic turn-on of circuit B also in accordance with the present invention. Manual control of circuit A with circuit B in automatic mode switches between: (1) turning circuit A off and locking circuit B in its current state; and (2) turning circuit A on and enabling circuit B to self-determine its state in accordance with operational mode. Circuit A turns off: (1) when occupancy times out; or (2) when the circuit A front panel pushbutton is actuated. Circuit B turns off: (1) when occupancy times out; or (2) when the circuit B front panel pushbutton is actuated; or (3) when ambient light goes above the setpoint (i.e., unless photocell is in turn-on only mode).

In accordance with another aspect of the present invention, a cascaded-off feature can be provided whereby circuit A turns off and circuit B remains on if it is already on. In this case, circuit B, if on, acts as a pilot as A turns off first.

Operation of Switching Power Supply

The power supply circuit 48 (FIG. 3) incorporates several unique features in accordance with the present invention. These feature are briefly stated here, and further described below. These features are:

current limit to 0.5 mA for electrical safety according to ground leakage limit;

switching power supply control by the microcontroller 38 which it powers;

start up circuit supplies initial microcontroller 38 current in order to start the microcontroller;

switching power supply is synchronous with ultrasonic sensor;

output voltage regulation is done by a shunt regulator across the output rail;

input voltage rail is determined by output voltage shunt, reflected through power supply voltage division transfer function; and power supply output current is determined by input current limit, reflected through power supply current multiplication transfer function.

Figure 11:
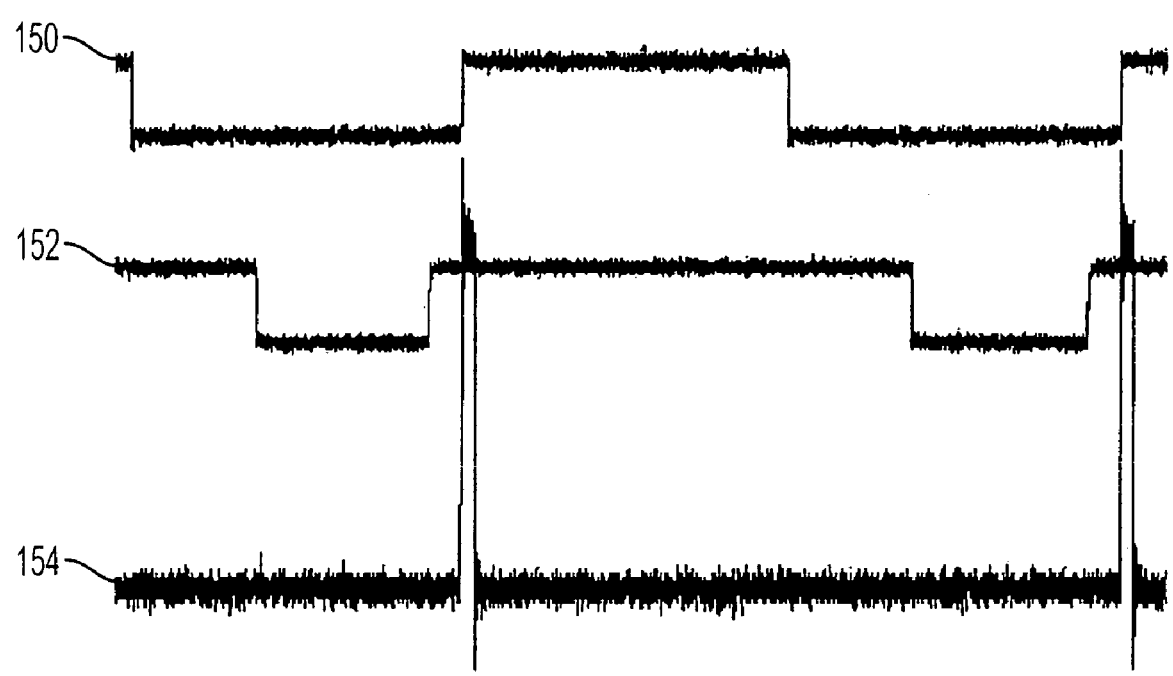
FIG. 11 is a graph illustrating a pulse signal generated at a selected phase difference with respect to operation of an occupancy sensor.

As stated above, wall switch replacement sensors are required to be small enough to fit into existing wall boxes. Although existing high frequency power supplies have been successful in providing the required power in small enough packages, they have not met another requirement of the small packaging, that is, noise reduction from sensor interference. In other words, when sensitive detector circuitry must exist very physically close to power supply components, power supply noise in the sensor signal path can result. The power board 28 of the present invention is advantageous because it uses a pulse that is synchronous (i.e., substantially simultaneous or characterized by an arbitrary fixed phase difference shown at 150 and 154 in FIG. 11) with the sensor ultrasonic frequency to prevent noise from the power supply from entering the signal path. The noise reduction achieved with synchronous operation allows for greater sensitivity and signal clarity than previous sensors with non-synchronous power supplies.

A description of power supply circuit 48 operation will now be made with reference to FIG. 3 which depicts an exemplary power board schematic in accordance with an embodiment of the present invention.

Filter and Safety

Filter 56 (i.e., inductor L101 and fusible resistor R102) separate the hot leg from the diode bridge rectifier 58 formed with diodes D107, D106, D108 and D105. The resulting LRC impedance dampens out any energy introduced during the switching of the load (e.g., lighting circuit A or B). In filter 62 (i.e., capacitor C111) accumulates charge to reach the peak voltage of the input AC line with reference to ground.

Current Limit

Resistors R129, R127, R131, R128, R103 and R104 with transistors Q110 and Q109 make a current limit circuit 60 that only allows an average of 0.5 mA to pass.

Start Up Pulse Generator

A start up pulse generator 68 comprises a capacitor C103 that accumulates the charge allowed by the current limit circuit until it reaches approximately the Zener voltage of Zener diode D102. Capacitor C109 charges through the resistor R122 from capacitor C103. Alternatively, diode D102 may be omitted, and the resistor R122 may be replaced with a series combination of a ~138V Zener diode and, for example, a 2K resistor. This alternate series combination circuit achieves a more rapid start up time, and the ~138V Zener diode is not biased above the Zener voltage during switcher operation (i.e., operation of diac D109 and SCR D112). When the voltage across capacitor C109 reaches somewhere between 26 and 36 VDC, the diac D109 breaks over approximately 10V and triggers SCR D112. The charge on C109 dumps into the 3.3V positive rail of the device 10 and is limited by resistor R132. The shunt regulator D100 prevents the 3.3V rail from transitioning too high. This pulse of current sustains the 3.3V rail for a time long enough to bring the sensor board microcontroller 38 out of reset mode and into stable operation.

Figure 6:
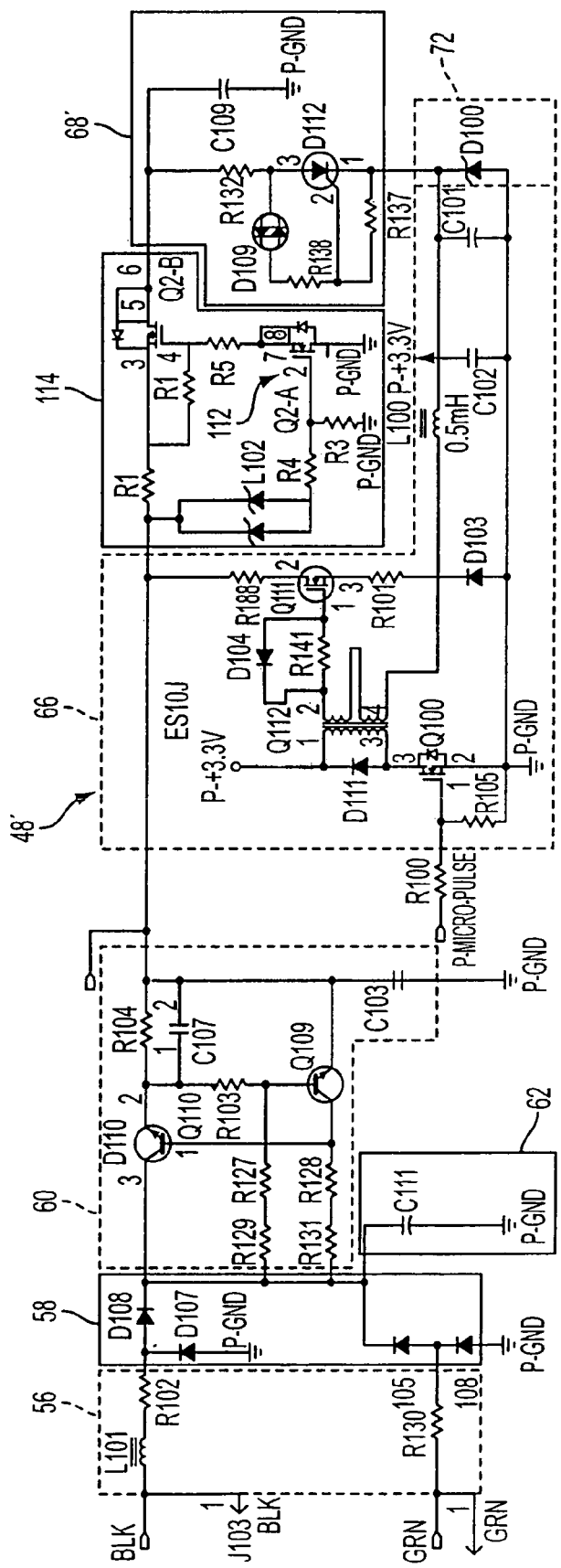
FIG. 6 is a schematic diagram of a switching power supply circuit constructed in accordance with another embodiment of the present invention.

Alternatively, resister R122 may be replaced with a switch such as a MOSFET switch 112, as shown in FIG. 6, in accordance with another embodiment of the power supply circuit 48' that is substantially the same as the power supply circuit in FIG. 3, except for the use of the MOSFET switch 112 and related components indicated at 114 and a start up pulse generator circuit 68' without the resister R122. When the voltage on capacitor C103 is at or above the Zener voltage, the MOSTFET switch 112 conducts, and capacitor C109 is charged. When the switching converter operates, the voltage on capacitor C103 will drop below the Zener voltage, and the switch will turn off. This configuration eliminates the need for a start up recycle inhibit circuit 70 described below, and also allows for quicker charging of capacitor C109.

Buck Regulator

Following microcontroller start up, the sensor board 26 outputs a pulse signal (e.g., via a P-Micro-Pulse signal on Pin 4 of the header J100 in FIG. 3). This is preferably a periodic signal of a 0.5 microsecond pulse of 3.3V followed by 24.5 microseconds of zero Volts (154 in FIG. 11). This pulse signal drives switch Q100 on in a buck regulator 66, thereby turning on a main switch Q111 through transformer Q112 and resistor R141 When the pulse signal (i.e., on Pin 4) returns to 0V, the switch Q100 turns off, and transformer Q112 flies back through diode D111 and diode D104, quickly turning off switch Q111. When switch Q111 is on, current flows from capacitor C103 through resistors R138, resistor R101 and switch Q111, and inductor L100 into the 3.3V rail, storing energy in inductor L100. When switch Q111 is off, current flows through diode D103 and inductor L100 into the 3.3V rail until the inductor L100 has depleted all of its stored energy. The ratio of on time to off time of the main switch Q111 sets the ratio of the voltage on capacitor C103 to the 3.3V rail. Since the 3.3V rail is clamped by shunt regulator 72 (i.e., D100), the duty cycle of main switch Q111 determines the voltage on capacitor C103 as long as current out of capacitor C103 is less than that set by the current limit circuit 60.

Start Up Recycle Inhibit

When pin 4 is providing pulses to the power board 28, some of the pulse energy is accumulated on capacitor C110 of a start up recycle inhibit circuit 70. This potential turns on switch U101, which drains capacitor C109 below the breakover voltage of diac D109. This prevents the start up circuit from operating while the pulse signal is present on pin 4.

The output 3.3V shunt and the switch duty cycle determine the voltage on capacitor C103. The start up pulse generator circuit 68 may automatically disable below a threshold voltage above the voltage planned for operation by the switch duty cycle. For example, consider the case if the lowest expected peak input voltage is 120V*0.9*1.414~152V. If an operating voltage for capacitor C103 is selected below this value, it may be used to enable or disable the start up pulse generator circuit 68. Selecting the capacitor C103 voltage at ~140V, for example, allows the use of available wide tolerance parts, while still providing start up for low line input. If the C103 voltage drops below the nominal 148V, the start up pulse generator circuit 68 is disabled.

US Circuit Operation

US circuit operation will now be described with reference to FIGS. 9 and 10 FIG. 9 is a schematic of an exemplary US transmitter circuit 42. FIG. 10 is a schematic of an exemplary US receiver circuit 44.

The US transmitter circuit 42 provides a square wave input (150 in FIG. 11) to ultrasonic transducers 32 (FIG. 2) that is preferably synchronized with the power supply circuit 48 to operate substantially simultaneously or with an arbitrary fixed phase difference. With reference to FIG. 9, the microcontroller 38 on the sensor board 26 operates switch Q7 to output an arbitrary pulse signal (e.g., a periodic signal of 12.5 microsecond pulse of 3.3V followed by 12.5 microseconds of zero Volts). This controls SAMPLE_OUT (152 in FIG. 11) which provides the demodulation pulse synchronously with US transmitter circuit 42. As described above in connection power supply operation, power supply switching (154 in FIG. 11) is substantially synchronous with the US transmitter circuit 42. In addition to facilitating generation of a transmitted US signal (i.e., SAMPLE_PULSE_OUT), the US transmitter (150 in FIG. 11) circuit 42 provides a sampling point signal (i.e., SAMPLE_OUT), as indicated in FIG. 9.

With reference to FIG. 10, the US receiver circuit 44 comprises a variable gain op amp circuit 80, sampling point/demodulating circuit indicated generally at 82, three RC circuits 84, 86, 88, an op amp buffer circuit 90 and a two stage op amp circuit 92. The inputs to ultrasonic receiver circuit 44 are the Doppler-shifted analog ultrasonic receiver signal (i.e., SAMPLE_PULSE_IN) and a digital sampling point signal (i.e., SAMPLE_OUT). The outputs of ultrasonic receiver circuit 44 are the demodulated, filtered analog ultrasonic receiver signal (i.e., US_SIGNAL) and an analog ultrasonic sampling point signal (i.e., SAMPLE_IN) that is provided to the microcontroller 38.

Variable gain op amp circuit 80 is an ultrasonic receiver preamplifier circuit. The input to this circuit is the modulated analog ultrasonic receiver signal (i.e., SAMPLE_PULSE_IN). The output of this circuit is an amplified, modulated analog ultrasonic receiver signal. Circuit 80 uses diodes D6 in the negative feedback path to switch in parallel with a resistor R48, thus decreasing the overall gain for large signal excursions, and preventing hard-limiting of the amplifier in the event of excessive continuous wave receiver signals. The resulting nonlinear transfer characteristic is advantageous when the sensor is installed in a confined space where wall reflections cause a large amount of acoustic energy to be directed into the ultrasonic receiver. It also provides a more gradually sloped decision surface for sample point optimization.

The inputs to the sampling point/demodulating circuit 82 are the amplified modulated analog ultrasonic receiver signal from the variable gain op amp circuit 80 and the analog sampling point signal (i.e., SAMPLE_IN). The output of circuit 82 is the demodulated Doppler-shifted analog ultrasonic receiver signal. The sampling point/demodulating circuit 82 varies the position (or phase) of the sampling point on the ultrasonic receiver waveform under control of the microcontroller 38, which produces the pulse signal (152 in FIG. 11), to prevent the loss of motion information due to large signal levels. For optimum sensitivity, the synchronous sample point on the ultrasonic receiver waveform should lie as close to the zero-crossing as possible.

RC circuit 84 is an envelope detector circuit. The input to RC circuit 84 is the Doppler-shifted analog ultrasonic receiver signal. The output of RC circuit 84 is the filtered, demodulated Doppler-shifted analog ultrasonic receiver signal. RC circuit 84 acts as an envelope detector and filters out the demodulation switching transients while preserving the demodulated signal information.

Op amp buffer circuit 90 serves to increase the drive capability of the synchronous demodulator circuit 82. The input to circuit 90 is the filtered, demodulated Doppler-shifted analog ultrasonic receiver signal. The output of circuit 708 is the increased drive, filtered, demodulated Doppler-shifted analog ultrasonic receiver signal.

RC circuit 86 is a low pass filter circuit. The input to RC circuit 86 is the increased drive, filtered, demodulated Doppler-shifted analog ultrasonic receiver signal. The output of RC circuit 86 is the increased drive, low pass filtered, demodulated Doppler-shifted analog ultrasonic receiver signal. The output of circuit 90 is low pass filtered to remove contributions due to motion in the environment, leaving a DC signal that represents the receiver carrier amplitude at the ultrasonic sample point. This signal is sampled by the digital microcontroller 38 through signal 94 to yield the analog ultrasonic sampling point (152 in FIG. 11) signal.

Two stage op amp circuit 92 is a bandpass filter circuit. The input to circuit 92 is the increased drive, filtered, demodulated Doppler-shifted analog ultrasonic receiver signal. The output of circuit 92 is the increased drive, bandpass filtered, demodulated Doppler-shifted analog ultrasonic receiver signal. The pass band of circuit 92 is designed to pass the Doppler-shifted signal for motions of interest.

RC circuit 88 is an anti-aliasing filter circuit. The input to RC circuit 88 is the increased drive, bandpass filtered, demodulated Doppler-shifted analog ultrasonic receiver signal. The output of RC circuit 88 is the anti-aliased, increased drive, bandpass filtered, demodulated Doppler-shifted analog ultrasonic receiver signal. The output signal 98 is sampled by the digital microcontroller 38 A/D circuitry and processed using digital signal processing techniques.

PIR Circuit Operation

An exemplary embodiment of the infrared sensor circuit 40 is shown in FIG. 8 and comprises a dual element pyroelectric infrared motion sensor circuit. The input to infrared sensor circuit 40 is infrared electromagnetic radiation. The output of infrared sensor circuit 40 is an electrical signal indicative of motion.

An exemplary embodiment of the infrared circuit 40 is shown in FIG. 8 and comprises two cascaded op amp bandpass circuits 100, 102. The input 104 to infrared circuit 40 is the electrical PIR sensor signal indicative of motion. The output 106 of infrared circuit 40 is a bandpass filtered infrared sensor signal indicative of motion. The output signal 106 of this circuit is sampled by A/D circuitry within the digital microcontroller 38 and processed using digital signal processing techniques.

Adaptation

Designing and tuning sensor adaptation takes a long time, largely because the adaptation time constants extend through several weeks. The dual circuit wall switch occupancy sensor device 10 of the present invention preferably employs adaptation algorithms such as those described in U.S. Pat. Nos. 5,986,357, 6,078,253 and 6,759,954, all to Myron et al (assigned to the same assignee as the present invention), which are believed to be robust in general.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method of supplying power to a load comprising the steps of:
    applying power to a current limiting circuit, the current limiting circuit being configured to limit one of leakage to ground current and leakage to neutral current to a selected average level;
    accumulating charge in a capacitance circuit disposed at an output of the current limiting circuit;
    selectively controlling discharge of the capacitance circuit into a power rail for powering a load connected to the power rail
    shunt regulating an output voltage on the power rail and using the output voltage to set an input voltage on the power rail; and
    receiving a pulse signal;
    wherein said selectively controlling step comprises operating a switch to control current discharged from the capacitance circuit to the power rail and controlling a duty cycle of the switch by selectively controlling the opening and closing of the switch in accordance with the pulse signal to determine voltage on the capacitance circuit when average current out of the current limited circuit is less than the selected average level.

2. A method as claimed in claim 1, wherein selectively controlling comprises providing a substantially constant current to the input of the power rail.

3. A method as claimed in claim 1, wherein the pulse signal is a periodic signal having a first portion during which the switch is on and a second portion during which the switch is off, the first portion being an approximately 0.5 microsecond pulse of a selected voltage and the second portion being approximately 24.5 microseconds of zero voltage.

4. A method as claimed in claim 1, wherein the duty cycle of the pulse signal is approximately $1/50$.

5. A power supply as claimed in claim 1, wherein the load is an occupancy based load controller, and the pulse signal is characterized by at least one of a selected fixed frequency, a selected fixed duty cycle, or a selected phase difference with respect to operation of an occupancy sensor for controlling the load controller.

6. A method as claimed in claim 1, wherein applying power comprises limiting one of leakage to ground current and leakage to neutral current to the selected average level of 0.5 milliamperes (mA).

7. A power supply for a load controller comprising:
   a rectifier circuit connected between an AC power source and a DC power rail;
   a regulator circuit connected to the DC power rail and operable to provide power to the load when the load is connected to the DC power rail, the regulator circuit comprising a storage device and a switch; and
   a capacitance circuit connected across the regulator circuit;
   wherein the regulator circuit is configured to selectively open and close the switch in accordance with a pulse signal, the switch allowing for current from the capacitance circuit to flow into the DC power rail and be stored in the storage device when the switch is closed and for current to flow into the DC power rail until the storage device is depleted with the switch is open; and
   wherein a duty cycle of the pulse signal is selected to control the operation of the switch synchronously with respect to operation of an occupancy sensor.

8. A power supply as claimed in claim 7, wherein the pulse signal is one of substantially simultaneous and characterized by a fixed phase difference with respect to the occupancy sensor.

9. A power supply as claimed in claim 7, further comprising a shunt circuit connected to the output of the DC power rail, wherein the input voltage of the DC power rail is based on the shunted output voltage of the DC power rail.

10. A power supply as claimed in claim 7, further comprising a current limit circuit connected to the capacitance circuit and configured to limit a corresponding one of leakage current to ground and leakage current to neutral in the power supply to a selected average level.

11. A power supply as claimed in claim 10, wherein output current on the DC power rail is determined by the limited input current.

12. A power supply as claimed in claim 7, wherein the occupancy sensor comprises an ultrasonic sensor having a sender transducer for generating ultrasonic acoustic energy to begin a signal path, the regulator circuit controls switching of the switch in accordance with the pulse signal to reduce interference of any noise from the power supply with the signal path of the ultrasonic sensor.

13. A power supply as claimed in claim 7, wherein the regulator circuit is configured to receive the pulse signal following its generation by a programmable processing device, and the power supply is operable to power the programmable processing device when connected to the DC power rail.

14. A power supply as claimed in claim 13, further comprising a start up pulse generator circuit connected to the regulator circuit and configured to supply initial current to the programmable processing device.

15. A power supply as claimed in claim 14, further comprising a start up inhibit circuit connected to the start up pulse generator circuit and operable to prevent operation thereof once the pulse signal is generated by the programmable processing device.

* * * * *